United States Patent
Skytt et al.

(10) Patent No.: US 8,425,394 B2
(45) Date of Patent: Apr. 23, 2013

(54) CENTRIFUGAL SEPARATOR WITH LUBRICATION DEVICE

(75) Inventors: Lars-Erik Skytt, Tullinge (SE); Per Fonser, Enskededalen (SE); Håkan Appelquist, Huddinge (SE); Leonard Borgström, Tyresö (SE)

(73) Assignee: Alfa Laval Corporate AB, Lund (SE)

( * ) Notice: Subject to any disclaimer, the term of this patent is extended or adjusted under 35 U.S.C. 154(b) by 28 days.

(21) Appl. No.: 13/140,528

(22) PCT Filed: Dec. 15, 2009

(86) PCT No.: PCT/SE2009/051418
§ 371 (c)(1),
(2), (4) Date: Sep. 28, 2011

(87) PCT Pub. No.: WO2010/071569
PCT Pub. Date: Jun. 24, 2010

(65) Prior Publication Data
US 2012/0021888 A1    Jan. 26, 2012

(30) Foreign Application Priority Data
Dec. 19, 2008  (SE) ........................ 0850156

(51) Int. Cl.
*B04B 9/00*  (2006.01)
(52) U.S. Cl.
USPC ............... 494/15; 494/83; 184/6.18; 384/468
(58) Field of Classification Search ............ 494/15, 494/38, 41, 43, 67–73, 83, 84; 184/6.18; 384/465, 468, 472, 473, 474
See application file for complete search history.

(56) References Cited

U.S. PATENT DOCUMENTS

| | | | |
|---|---|---|---|
| 3,384,312 A | | 5/1968 | Patterson et al. |
| 3,782,647 A | | 1/1974 | Decker et al. |
| 3,801,026 A | | 4/1974 | Decker et al. |
| 4,541,736 A | * | 9/1985 | Giebeler, Jr. .................. 384/465 |
| 4,941,866 A | * | 7/1990 | Gorodissky et al. ............ 494/14 |
| 5,848,959 A | * | 12/1998 | Droste et al. .................... 494/15 |
| 6,117,063 A | * | 9/2000 | Szepessy et al. ................ 494/14 |
| 6,228,016 B1 | * | 5/2001 | Kristensen et al. ............. 494/14 |

(Continued)

FOREIGN PATENT DOCUMENTS

| | | | |
|---|---|---|---|
| EP | 756897 A1 | * | 2/1997 |
| EP | 0756897 A1 | | 2/1997 |

(Continued)

*Primary Examiner* — Charles E Cooley
(74) *Attorney, Agent, or Firm* — Michaud-Kinney Group LLP

(57) ABSTRACT

The invention relates to a centrifugal separator having a bearing device and a lubricating device comprising a rotatable pump device. The pump device comprises a lubricant inlet to receive lubricant from a lubricant reservoir, and a duct to convey lubricant to an outlet device for delivering at least part of said lubricant in the form of lubricant mist through at least one lubricant outlet. The pump device further comprises a gas inlet and the outlet device comprises a gas outlet, whereby during rotation of the pump device a gas flow is maintained from the gas inlet to the gas outlet bringing along lubricant present in the duct towards the outlet device. The centrifugal separator further comprises a housing which surrounds the bearing device and the lubricating device and which allows lubricant mist to pass from the lubricating device to the bearing device in order to lubricate the latter.

21 Claims, 5 Drawing Sheets

U.S. PATENT DOCUMENTS

| | | | |
|---|---|---|---|
| 6,267,204 B1 * | 7/2001 | Kristensen et al. | 184/6.16 |
| 6,578,670 B1 * | 6/2003 | Klintenstedt et al. | 184/6.16 |
| 6,626,814 B1 * | 9/2003 | Setterberg | 494/15 |
| 6,860,365 B2 * | 3/2005 | Stones | 184/6.16 |
| 6,988,980 B2 * | 1/2006 | Moss | 494/15 |
| 7,588,526 B2 * | 9/2009 | Kleimann et al. | 494/15 |
| 2003/0015373 A1 * | 1/2003 | Stones | 184/6.18 |
| 2005/0065010 A1 * | 3/2005 | Moss | 494/15 |
| 2006/0144979 A1 | 7/2006 | Nieminen et al. | |
| 2009/0111676 A1 * | 4/2009 | Kleimann et al. | 494/46 |
| 2010/0255976 A1 * | 10/2010 | Mackel et al. | 494/15 |
| 2010/0273625 A1 * | 10/2010 | MacKel et al. | 494/15 |
| 2012/0021888 A1 * | 1/2012 | Skytt et al. | 494/15 |
| 2012/0071313 A1 * | 3/2012 | Mackel et al. | 494/11 |

FOREIGN PATENT DOCUMENTS

| | | | |
|---|---|---|---|
| JP | 04016254 A | * | 1/1992 |
| SE | 521030 C2 | | 9/2003 |
| WO | 00/53329 | * | 9/2000 |
| WO | 2005102530 A1 | | 11/2005 |
| WO | 2007041819 A1 | | 4/2007 |

\* cited by examiner

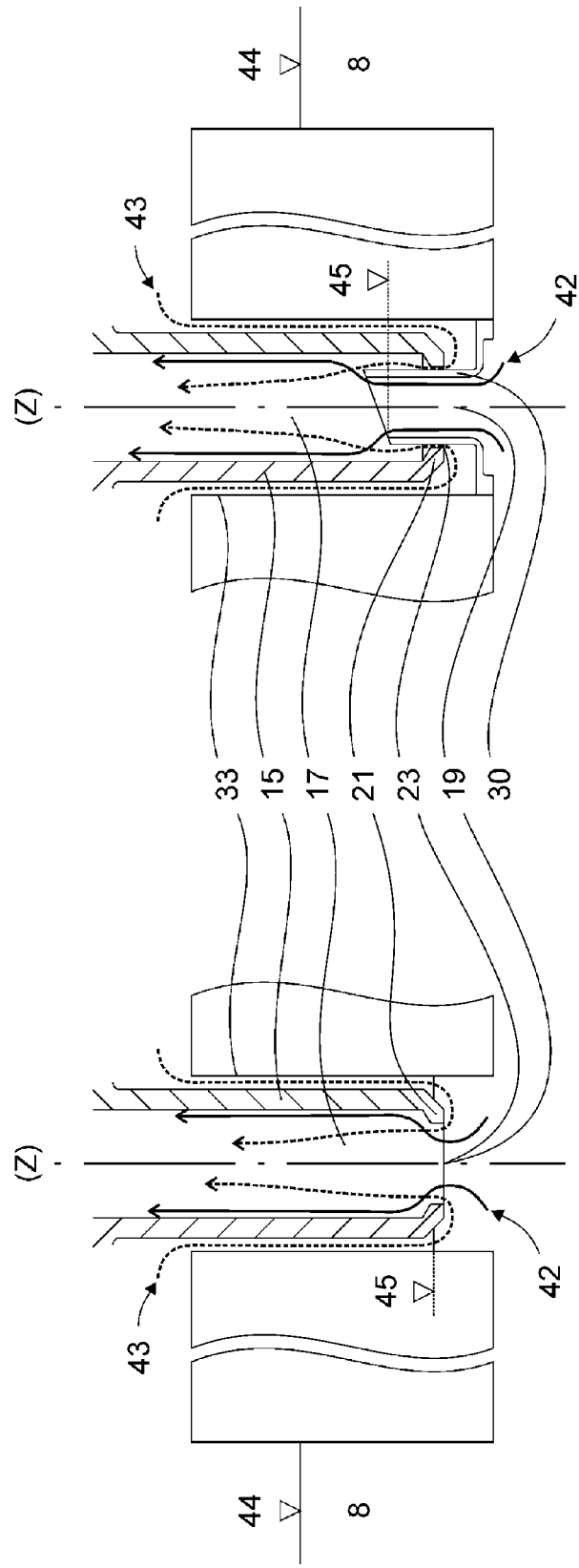

CENTRIFUGAL SEPARATOR WITH LUBRICATION DEVICE

FIELD OF THE INVENTION

The present invention relates to a centrifugal separator and more particularly to a centrifugal separator having a pump device for generating a lubricant mist.

BACKGROUND OF THE INVENTION

A centrifugal separator is adapted to centrifugal separation of at least a first component and a second component from a supplied medium. The supplied medium may be in liquid or gas phase and may contain various types of particulate material.

Achieving correct lubrication of the bearing or bearings which support the rotor of a centrifugal separator is a problem. If a bearing receives too much lubricant, the friction and thus the temperature in the bearing increases, and if the bearing receives too little lubricant there is risk of the bearing seizing.

As a simple way of providing one or more bearings in a centrifugal separator with correct lubrication and cooling a mist of lubricant can be used. For it to be possible for such a lubricant mist to be conveyed to a bearing and used for achieving correct lubrication of that bearing, the lubricant mist should not comprise drops larger than a certain size. A lubricant mist which comprises drops larger than a certain size risks over lubricating the bearing. At the same time, such a lubricant mist will not be stable enough to withstand being conveyed to a remote lubrication point such as a bearing, since large particles, owing to their mass, are more influenced by gravity and inertia forces, causing them to hit and moisten various surfaces in the separator before they reach the desired lubrication point. The generation of lubricant mist also needs to be adaptable to the centrifugal separator's operating conditions in order to provide correct lubrication of one or more bearings during varying operating conditions.

EP 0756897 A1 (Veronesi Separatori S.p.A) refers to a centrifugal separator of the above-mentioned type, comprising an upper and a lower bearing on a rotating spindle and a device for generating lubricant mist. Above the lower bearing, the spindle is provided with a disc having apertures which during rotation draw lubricant up through stationary ducts in contact with an oil pan situated below. Lubricant drawn up through the ducts is projected by the disc in the form of drops or lubricant mist. The lubricant mist thereafter lubricates the lower bearing via further apertures in the rotating disc.

SE 521030 C2 (Alfa Laval Corporate AB) refers to a lubricant supply device in a centrifugal separator comprising a spindle with a longitudinal duct which has an orifice immersed in a pan of lubricant and adapted to conveying a flow of lubricant through the duct. The duct comprises a distribution means which divides off a selected amount of the flow for conveying to and through a lower bearing and also upwards to an upper bearing in the form of lubricant mist.

SUMMARY OF THE INVENTION

An object of the present invention is to propose a centrifugal separator with correct lubrication of one or more bearings in the centrifugal separator.

Another object of the present invention is to use lubricant mist for lubrication of one or more bearings in the centrifugal separator.

A further object of the present invention is to improve the generation of lubricant mist in the centrifugal separator.

These and other objects are achieved by the present invention, which relates to a centrifugal separator comprising a spindle rotatably arranged in the centrifugal separator via a bearing device and connected to a rotor in which centrifugal separation takes place during operation. The centrifugal separator further comprises a drive device adapted to causing the spindle and the rotor to rotate during operation, and a lubricating device. The lubricating device comprises a reservoir which is arranged to contain a quantity of lubricant and a pump device which is disposed in the centrifugal separator and is rotatable about a central axis. The pump device comprises a lubricant inlet situated at a first radially inner level for receiving lubricant from the lubricant reservoir, and a duct for conveying lubricant from the lubricant inlet to an outlet device for delivering at least part of said lubricant out from the lubricating device in the form of lubricant mist through at least one lubricant outlet situated outside the first radial inner level. The pump device further comprises a gas inlet for input of a quantity of gas into the duct, and the outlet device comprises a gas outlet for delivery of said quantity of gas from the duct, whereby a gas flow is maintained from the gas inlet to the gas outlet during rotation of the pump device, in such a way that the gas flow brings along lubricant present in the duct towards the outlet device. The centrifugal separator further comprises a housing which at least partly surrounds the bearing device and the lubricating device and which allows lubricant mist to pass from the lubricating device to the bearing device.

The fact that the pump device comprises such gas inlet and gas outlet makes it possible for the conveying of lubricant to the outlet device to be increased, and improves the generation of lubricant mist in the lubricating device.

According to an embodiment of the invention, said gas outlet comprises a tubular duct and extends from a radially outer portion of the outlet device to a radially inner portion of the outlet device, at a second radially inner level, in communication with the duct in order, during rotation of the lubricating device, to generate a transfer of said quantity of gas from the gas inlet to the outlet device, resulting in a pumping action and carrying a lubricant flow from the lubricant inlet to the outlet device in order thereby to improve the generation of lubricant mist.

According to another embodiment of the invention, said lubricant outlet comprises a tubular duct and extends from a radially outer portion of the outlet device to a radially inner portion of the outlet device, outside the second radially inner level, in communication with the duct in order, during rotation of the lubricating device, to deliver said lubricant in the form of lubricant mist.

According to a further embodiment of the invention, at least one of said lubricant outlets and at least one of said gas outlets lead into a common outlet at a radially outer portion of the outlet device. The result is a further atomisation of the lubricant mist. As an alternative, the lubricant outlet and the gas outlet may coincide at a radially outer portion of the outlet device and constitute one or more common outlets for delivery of both lubricant and gas. Each such outlet has an outer end at an outer radius of the outlet device and an inner end in communication with the duct.

According to a further embodiment of the invention, said lubricant outlets have one or more constrictions, such as nozzles. As it passes through these constrictions or nozzles, at least part of the lubricant flow is atomised to particles in the form of a lubricant mist. Said constrictions may be situated at the outermost radius of the lubricant outlets but may also be situated at a smaller radius. Alternatively, said lubricant outlets are configured without any substantial constrictions.

The lubricant outlets and the gas outlets are even or odd in number and may be evenly distributed in a circumferential direction about the central axis. The outlet device may be so configured that the number of lubricant outlets and/or gas outlets can be adapted by one or more lubricant outlets and/or gas outlets being blocked as necessary, e.g. by a plug. The flow through a gas outlet may also be reduced by fitting where necessary, a nozzle with a desired flow resistance.

The lubricant outlets may be so configured that the radial extent of the accumulated amount of lubricant will be as great as possible when there is a given amount and a given flow of lubricant. The lubricant outlets, and hence the outlet device, may have a large radial extent in order to achieve a large effect of the centrifugal forces which are used for driving the flow of lubricant through the lubricant outlets. The lubricant outlets may also be of tubular configuration with a substantially radial extent with each tube being further so configured that its cross-sectional area is great enough to minimise flow resistance and at the same time small enough to allow a large radial extent of the accumulated amount of lubricant, in the form of a column of said lubricant radially inside the constriction or nozzle.

According to a further embodiment of the invention, the pump device is substantially rotationally symmetrical but may also take the form of a polygon or be configured in some other way so that it is substantially balanced during rotation.

According to a further embodiment of the invention, the lubricating device comprises an input means for input of lubricant into the pump device. The gas inlet may take the form of an aperture between the pump device and the input means. The input means may comprise a non-rotatable tubular element with a first end which extends into the duct in the pump device, thereby improving the pumping action of the gas flow and the conveying of the lubricant flow to the outlet device.

According to a further embodiment of the invention, said first end of the tubular element has an asymmetrical termination. This configuration improves the delivery of lubricant from the non-rotatable tubular element to the duct. Said asymmetrical termination may alternatively take such forms as an obliquely cut end, a recess or a hole.

According to a further embodiment of the invention, the duct comprises a constriction in the form of a radially inner annular edge at the pump device's lubricant inlet. This configuration results in a limitation of the flow of lubricant out from the pump device past this edge, and thus directs the flow of lubricant towards the output device.

According to a further embodiment of the invention, the lubricating device comprises a device for regulating the lubricant flow to the pump device with respect to the lubricant's viscosity or some other physical characteristic related to the lubricant's viscosity. This provides for enough lubricant to be conveyed through the duct to the outlet device to generate an adequate amount of lubricant mist at varying viscosity of the lubricant, especially at a high viscosity of the lubricant. The regulation of the lubricant flow may also have the object of limiting the amount of lubricant mist in order to minimise risk of over lubrication, leakage and loss of lubricant, especially at a low viscosity of the lubricant. The regulating device may be disposed at the pump device's lubricant inlet but may also be disposed in the pump device.

According to a further embodiment of the invention, the lubricant flow to the outlet device is regulated with respect to the lubricant's temperature. This provides for sufficient lubricant mist to be generated at varying temperatures and hence at varying viscosities of the lubricant. In particular, it provides for sufficient lubricant mist to be generated before the lubricant has reached a working temperature. The lubricant flow may alternatively be regulated with respect to some other physical characteristic connected with the lubricant's viscosity than its temperature, which characteristic may be detected by rheometric, electrical or dielectrical methods.

According to a further embodiment of the invention, the device for regulating the lubricant flow comprises a thermostatically controlled valve. In this way the amount of lubricant conveyed through the duct to the outlet device can be regulated on the basis of the lubricant's temperature in a simple, effective and reliable manner. The valve may comprise a valve body acted upon by surrounding temperature, and a seat towards which the valve body moves to regulate the flow. Alternatively, the tubular element is connected to the seat for the thermostatically controlled valve body. The valve body may comprise a wax element enclosed in a housing which is further so configured that the valve body expands with increasing temperature. The valve may alternatively be provided with thermally activated portions of bimetal or shape-memory alloy or be of some other similar configuration which allows lubricant flow regulation with respect to temperature.

According to a further embodiment of the invention, the lubricating device comprises a bypass duct which allows lubricant to pass to the outlet device when the device for regulating the lubricant flow is closed. At least a minimum amount of lubricant mist is thus generated during operation in order to provide sufficient lubrication and cooling of the bearing device.

According to a further embodiment of the invention, the pump device is connected axially to the centrifugal separator's spindle so that rotation of the spindle is converted to rotation of the pump device. The need for further drive devices is thus limited and the lubricating device is of simple, robust and operationally reliable construction. The pump device may also be associated in some other way with a spindle so that it is caused, by a device provided with driving belts, gearwheels or the like, to rotate as a result of the spindle's rotation and thereby pump lubricant while the centrifugal separator's spindle is rotating. The pump device may also take the form of a separate unit disconnected from the spindle, in which case the lubricating device will have a separate drive device for driving the pump device. The pump device may then be caused to rotate at desired speeds independently of the spindle's rotation in order to generate lubricant mist as necessary.

According to a further embodiment of the invention, the pump device is arranged for rotation in a carrier for the bearing device, thereby allowing the possibility of a simple axial connection between the lubricating device and the centrifugal separator's spindle.

According to a further embodiment of the invention, the carrier for the bearing device is provided with at least one duct to convey gas from a space in or outside the centrifugal separator's housing to the pump device via latter's gas inlet. The gas conveying duct may take the form of a gap between the pump device and the carrier for the bearing device, which gap extends axially, from a space in the carrier for the bearing device above the quantity of lubricant which is present in the lubricant reservoir, to the pump device's gas inlet.

According to a further embodiment of the invention, the carrier is provided with at least one aperture radially outside said lubricant outlet, which aperture allows lubricant mist to pass from the lubricating device to the bearing device in the centrifugal separator's housing.

According to a further embodiment of the invention, the carrier is provided with further apertures radially outside said lubricant outlet, in which case the apertures are divided off in a circumferential direction by wall elements. This improves the generation of lubricant mist and achieves a further atomisation of the lubricant particles therein. The shape of the apertures may be varied to being circular, elongate, quadrilateral or some other shape appropriate to the purpose. The apertures may be arranged in a radial direction or at angles to the radial direction, in order thereby to increase the number of surfaces and edges which may be encountered by lubricant and thereby improve the generation of lubricant mist. The number of such surfaces and edges may also be increased by disposing wires, milled grooves, drilled holes or the like radially outside the outlet device.

According to a further embodiment of the invention, the bearing device comprises at least a first and a second bearing means. The outlet device may be disposed axially with the spindle between the first and second bearing means or outside the first bearing means and the second bearing means.

According to a further embodiment of the invention, the centrifugal separator comprises a fan device for generating a gas flow in the centrifugal separator's housing in order to convey lubricant mist from the lubricating device to the bearing device.

BRIEF DESCRIPTION OF THE DRAWINGS

Preferred embodiments of the invention are described in more detail below with reference to the attached schematic drawings.

FIG. 4 depicts an axial section through a portion of a lubricating device according to the invention.

FIG. 5 depicts an axial section through a portion of a lubricating device according to the invention.

DETAILED DESCRIPTION OF THE INVENTION

Figure 1:
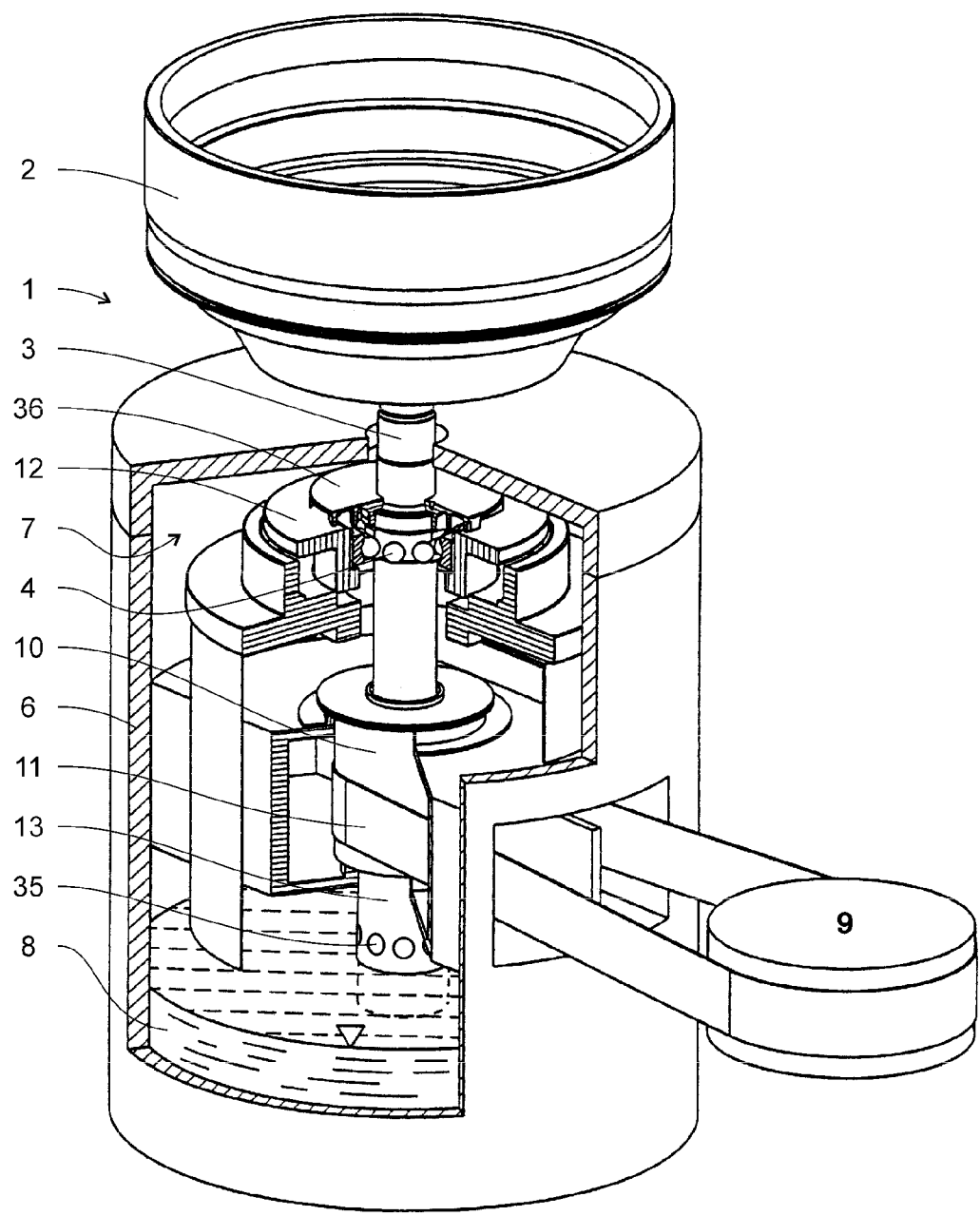
FIG. 1 depicts a partly sectioned view as seen obliquely from above of a centrifugal separator according to the invention.

An example of a centrifugal separator 1 according to the invention is depicted in FIG. 1 and comprises a spindle 3 adapted to supporting a centrifugal rotor 2. The spindle is arranged for rotation about an axis of rotation, which in the example depicted is vertical, in a first bearing means 4 and a second bearing means 5 (see FIG. 2). The centrifugal separator comprises a housing 6 partly surrounding a space 7 which comprises the spindle 3, the first bearing means 4, the second bearing means 5 and a reservoir 8 which is adapted to containing a quantity of lubricant. The lubricant is liquid under the centrifugal separator's operating conditions, e.g. its operating temperature, and may take the form of a lubricating oil. The centrifugal separator further comprises a drive motor 9 associated, via a transmission means 11, e.g. a driving belt depicted in FIG. 1, with a belt pulley 10 connected to the spindle. The transmission means may alternatively take the form of a propeller shaft, toothed gearing or the like, and the drive motor may alternatively be connected directly to the spindle. The first bearing means 4, the top bearing, is supported in the housing by an upper bearing carrier 12, and the second bearing means 5, the bottom bearing, is supported by a lower bearing carrier 13.

Figure 2:
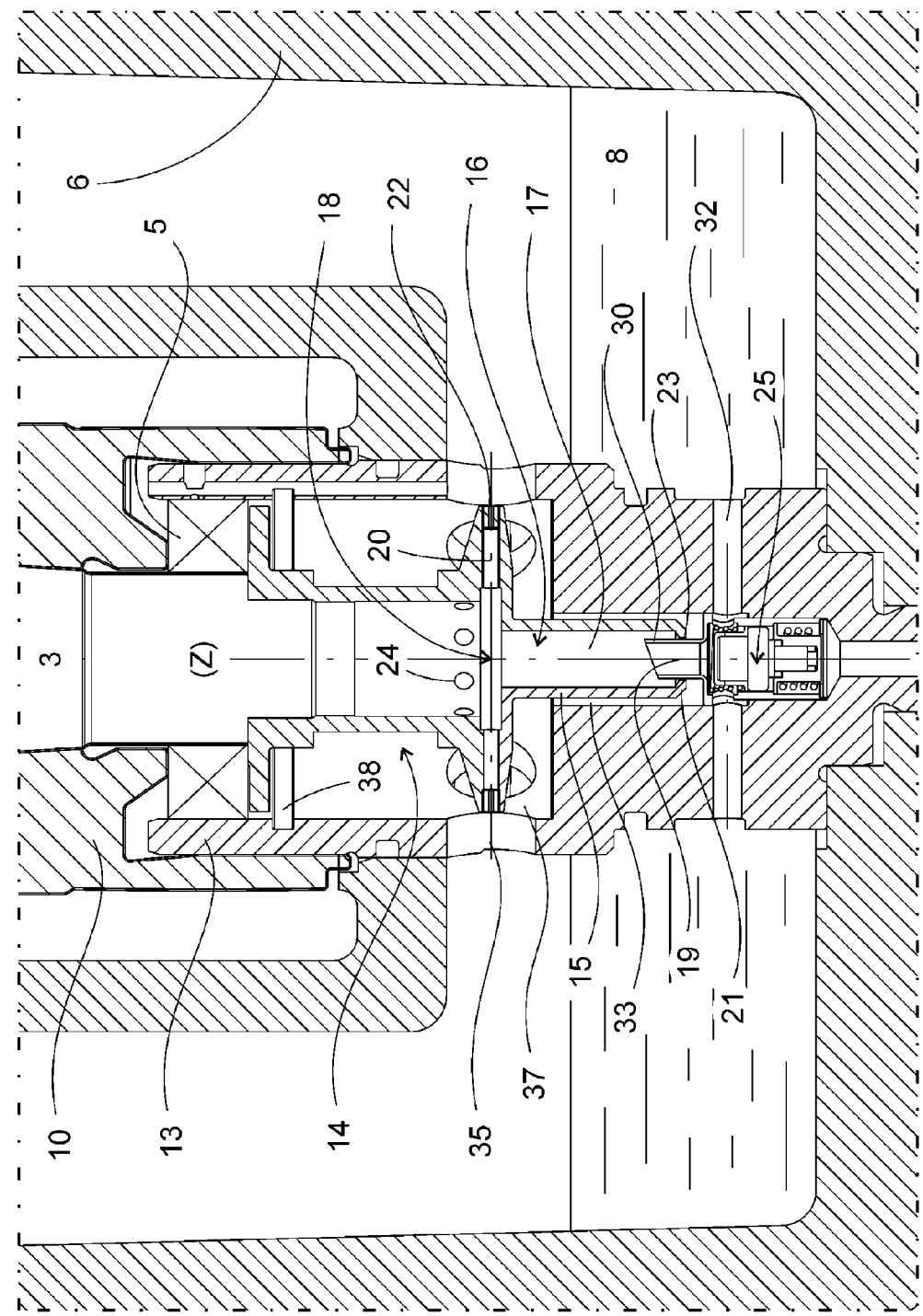
FIG. 2 depicts an axial section through a centrifugal separator with a lubricating device according to the invention.
Figure 3:
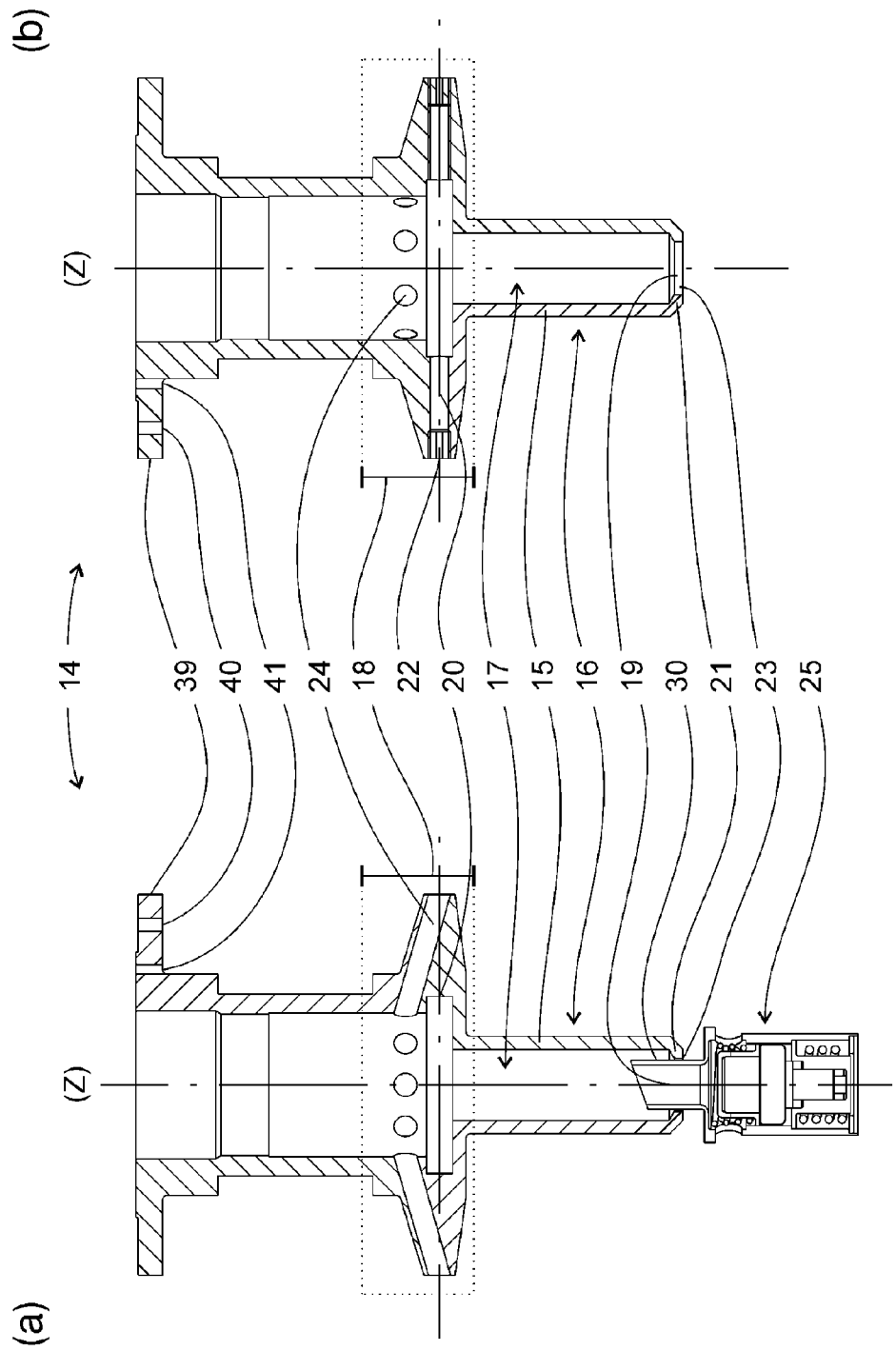
FIG. 3 depicts two mutually rotated axial sections through lubricating devices according to the invention, (a) with and (b) without a regulating device.

The centrifugal separator comprises a lubricating device 14 depicted in FIG. 2 and further in FIG. 3, which itself comprises a pump device 16 arranged for rotation. The pump device 16 in the example depicted in the drawings is connected to the spindle 3 and fitted at the lower end of the spindle, so that it rotates when the spindle rotates. The pump device comprises a pipe 15 which forms a duct 17 extending from a lubricant inlet 19, intended for input of lubricant to the duct 17, to an outlet device 18 situated above the lubricant level in the reservoir 8. The outlet device comprises at least one lubricant outlet 20 situated at a larger radial distance from the lubricating device's centreline Z than the lubricant inlet 19, for delivery of lubricant from the duct. The outlet device takes the form of an element protruding radially from the pipe and supporting said lubricant outlet 20. Typically, the number of lubricant outlets is one to eight. Said lubricant outlet 20 has at least one constriction at a radially outer portion. The constriction takes the form of a detachable and interchangeable nozzle 22 adapted to atomising lubricant which passes the nozzle to a mist. The configuration and number of the nozzles are selected to produce a sufficiently atomised lubricant mist in sufficient quantity and to prevent obstruction by particles in the lubricant.

The pump device 16 further comprises a gas inlet 23 for inlet of gas into the duct, and the outlet device 18 comprises at least one gas outlet 24 for delivery of said quantity of gas from the duct. Said gas outlets 24 are situated on a radius larger than a largest radius of the gas inlet 23. Typically, the number of gas outlets is one to eight. Each gas outlet 24 has an outer end at an outer radius of the outlet device and an inner end at an inner radius of the outlet device. The inner end is in communication with the gas in the duct 17 and may be so configured that during rotation of the pump device 16 it extends radially inside of the film of lubricant which is conveyed along the walls of the duct, i.e. it is situated on a smaller radius than the inner radius of any of the lubricant outlets 20. The fact that the radially inner portions of the lubricant outlets 20 and gas outlets 24 are disposed on different radii in the outlet device 18 results during rotation of the pump device 16 in substantially a conveying of lighter gas out through gas outlets and heavier lubricant out through lubricant outlets.

FIG. 4 depicts the flow of lubricant and gas into a pump device during operation. During rotation of the pump device, lubricant at the lubricant inlet 19 is moved out towards the inner wall of the duct 17 by centrifugal force, thereby driving a flow of lubricant 42 from the reservoir 8 to the outlet device 18 via the lubricant inlet 19. The flow of lubricant is in the form of a film of lubricant conveyed along the walls of the duct 17. At the orifice of the duct there is a constriction 21 in the form of a flange directed radially inwards. The main function of the flange 21 is to provide a minimum thickness of said film. The flange thereby limits the flow of lubricant away from the outlet device. During rotation of the pump device 16, gas moves under the influence of centrifugal force out through gas outlets 24 in the outlet device, thereby generating negative pressure in the duct 17, with the result that lubricant is drawn in through the lubricant inlet 19 and gas is drawn in through the gas inlet 23. The rotation thus generates a flow of gas 43 from ducts 33 which are adapted to leading gas via the gas inlet 23 to the outlet device 18, the gas bringing along the flow of lubricant from the lubricant inlet 19 to the outlet device 18. A large radial extent of the gas outlets 24 results in a great effect of the centrifugal forces which are used for driving the flow of gas and lubricant from the gas inlet 23 to the outlet device 18 so that a flow of lubricant is maintained in order to generate lubricant mist in sufficient quantity and quality.

It should be noted that both lubricant and gas can pass into the pump through the gas inlet 23 and that gas can also come in through the lubricant inlet 19. As depicted in FIG. 4, the lubricant inlet 19 and the gas inlet 23 may coincide in a common inlet in the pump device, in which case gas is drawn into the duct 17 in the form of gas bubbles or as a pulsating or alternating flow of lubricant and gas.

Initially, the portion of the pump device 16 which is below the level of lubricant in the lubricant reservoir is filled with lubricant. Lubricant may therefore initially be present in the ducts 33 which are intended to lead gas to the gas inlet 23. Rotation of the pump device 16 generates negative pressure in the duct 17, with the result that lubricant is drawn in through the lubricant inlet 19 and the gas inlet 23. After the lubricant present in the ducts 33 has been drawn into the pump device so that the ducts 33 allow gas to pass, they will lead gas to the gas inlet 23 and on into the pump device. The pump device's lubricant inlet 19 is situated below the lubricant level 44 in the lubricant reservoir 8. During operation, a flow of lubricant into the pump device will be maintained. A driving force for this flow is the difference between the lubricant level 44 in the lubricant reservoir and an operating level 45 of the lubricant in the pump device. Another driving force for this flow is the negative pressure generated in the pump device during rotation.

The lubricating device may, as depicted in FIG. 3*a*, be provided with an input means in the form of a tubular element 30 with a first end which extends into the pump device 16 for input of lubricant. The tubular element 30 is arranged concentrically with the pump device 16 but may also be off-centre in a direction transverse to the axis of the pump device. The gas inlet 23 is configured as an aperture between the constriction 21 at the orifice of the duct 17 and an outer surface of the tubular element 30. This aperture takes the form of a circular gap but other configurations are also possible. The circular gap needs to be narrow to provide an adequate flow of gas and lubricant through the pump device and to maintain good entrainment of the lubricant flow by the gas flow, but at the same time as wide as possible to facilitate manufacture and assembly. The tubular element 30 has at its end pointing towards the duct 17 an obliquely cut asymmetrical termination 31.

FIG. 5 depicts the flow of lubricant and gas into a pump device of a lubricating device provided with an input means in the form of a tubular element 30. In a manner corresponding to that described in relation to FIG. 4, during rotation of the pump device 16, gas moves under the influence of centrifugal force out through gas outlets 24 in the outlet device, thereby generating negative pressure in the duct 17, with the result that lubricant is drawn in through the lubricant inlet 19 and gas is drawn in through the gas inlet 23. The rotation thus generates a flow of gas 43 from ducts 33 which are adapted to leading gas to the outlet device 18 via the gas inlet 23. Lubricant moves in through the tubular element 30 and is delivered towards the inner wall of the duct 17, resulting in a film of lubricant being conveyed along the walls of the duct 17. The asymmetrical termination is intended to facilitate the delivery of lubricant from the tubular element 30 to the inner wall of the duct 17, particularly when there is little flow of lubricant. The flow of gas 43 in the duct carries lubricant from the lubricant inlet 19 to the outlet device 18, thereby maintaining a flow of lubricant 42 from the reservoir 8 to the outlet device 18 via the lubricant inlet 19 during operation of the lubricating device.

Rotation of the pump device 16 thus creates a flow of lubricant from the lubricant inlet 19 to the outlet device 18 whereby the lubricant reaches said lubricant outlet 20 and passes a nozzle 22. At a sufficient flow of lubricant relative to selected nozzle dimensions, lubricant accumulates radially inside the nozzle in such a way that, owing to centrifugal forces, the accumulated amount increases the pressure on the lubricant which passes the nozzle, with the result that the lubricant is effectively atomised and lubricant mist in sufficient quantity and quality is generated.

Initially, before sufficient lubricant has been conveyed to the outlet device, both lubricant outlets 20 and gas outlets 24 will deliver gas during rotation of the pump device. When the temperature of the lubricant rises from an initial starting temperature to a working temperature and the viscosity of the lubricant therefore decreases, both gas and lubricant may be caused to pass through the lubricant outlets 20.

The lubricating device 14 may further comprise, as depicted in FIG. 2, a regulating device 25 adapted to regulating the flow of lubricant from the lubricant reservoir 8 to the lubricant outlet 20 via the pump device 16. As depicted in the drawing, the regulating device 25 is disposed at the lubricant inlet 19 but may also be disposed in the pump device 16, in which in a corresponding manner it will be adapted to regulating a flow of lubricant.

Figure 6:
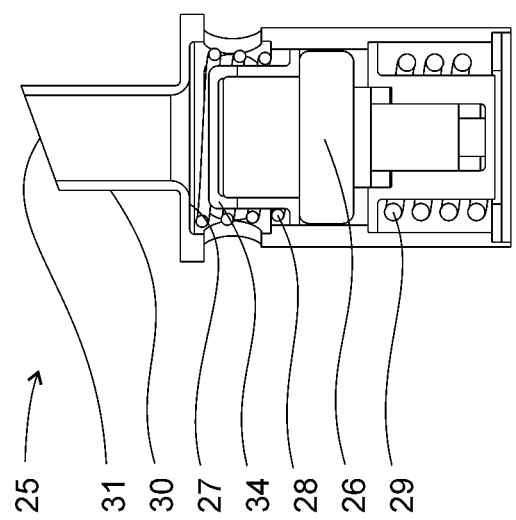
FIG. 6 depicts an axial section through a regulating device according to the invention.

The regulating device 25, see FIG. 6, comprises a choke in the form of a valve which regulates the flow of lubricant on the basis of the lubricant's temperature. The valve comprises a valve body 26 acted upon by surrounding temperature, and a seat 27 towards which the valve body moves in order thereby to regulate the flow. The valve body comprises a wax element enclosed in a housing and is so configured that it expands with increasing temperature. The valve body is surrounded on each side by a first spring means 28 and a second spring means 29, the first 28 of which is relatively weaker than the second 29 and adapted to keeping the valve body 26 away from the seat 27 when the valve body is contracted and the valve is open. The second spring means 29 is adapted to allowing a further expansion of the valve body when the valve body 26 and the seat 27 are in contact, to prevent the valve becoming damaged. As depicted in FIGS. 2 and 3, the regulating device 25 is adapted to regulating a flow of lubricant from the lubricant reservoir 8 to the pump device's lubricant inlet 19.

The tubular element 30 has at its end which points away from the duct 17 a surface which serves as a seat 27 for the valve body 26. The seat 27 and the valve body 26 are so configured that when they abut against one another they allow a limited flow of lubricant to pass between the seat 26 and the valve body 27. The seat or the valve body may thus be provided with a bypass duct 34, e.g. a groove, for passage of lubricant, or with spacing elements which prevent the valve and the seat from closing tight. The bypass duct 34 for passage of lubricant may also be provided by a limitation of the valve body's travel or in some other known way.

The lubricating device 14 is disposed in a carrier for the bottom bearing, the bottom bearing carrier 13, which extends from the centrifugal separator's housing 6 towards the spindle 3. The carrier extends from the housing's bottom surface and is so configured that it surrounds the lubricating device 14. The bottom bearing carrier 13 is provided with apertures and ducts 32 to convey lubricant from the lubricant reservoir 8 to the pump device's lubricant inlet 19, which apertures may be provided with filters to filter out particles in the lubricant.

The bottom bearing carrier 13 is provided with at least one duct 33 to convey gas from a space in or outside the centrifugal separator's housing 6 to the pump device 16 via latter's gas inlet 23. As depicted in FIG. 2, the gas conveying duct 33 takes the form of a gap between an outer surface of the pump device 16 and the bottom bearing carrier 13, which gap extends axially from a space in the bottom bearing carrier above the quantity of lubricant which is present in the lubricant reservoir 8 to the vicinity of the pump device's gas inlet 23.

The bottom bearing carrier 13 is further provided with apertures 35 radially outside the outlet device 18 of the lubricating device 14 to allow lubricant and gas to pass through. The apertures 35 are distributed in a circumferential direction and are delineated by wall elements 37. The wall elements 37 are so configured that lubricant from the lubricant outlets encounters one or more edges and/or surfaces on the wall elements, thereby improving the generation of lubricant mist. Lubricant is led in the form of lubricant mist to a space outside the lubricating device in communication with a space 7 in the centrifugal separator's housing, which space allows lubricant mist to pass from the lubricating device 14 to the bearing device. The centrifugal separator further comprises a fan device 36 which is associated with the spindle 3 and disposed axially above the top bearing 4 and adapted to maintaining, during rotation of the spindle, a circulating flow of air and lubricant mist in the space 7. Lubricant mist moves with the flow to the top bearing 4, where it lubricates and cools said bearing.

The bottom bearing 5 is situated axially above the outlet device 18 in the bottom bearing carrier 13. Lubricant mist is also led up through the bottom bearing carrier 13 to the bottom bearing 5, where it lubricates and cools said bearing. The bottom bearing carrier 13 is provided on the inside with a groove 38 axially below the bottom bearing 5 and axially above the apertures 35 which are situated radially outside the outlet device 18 of the lubricating device 14. The groove 18 is adapted to preventing lubricant from being conveyed along the carrier's inner wall to the bottom bearing 5. The groove 38 may be drained to the outside of the bottom bearing carrier 13 or towards said apertures. As depicted in FIG. 3, the pump device 16 is provided axially between the outlet device 18 and the bottom bearing 5 with a radially protruding disc 39 which protects the bottom bearing 5 from being directly encountered by large drops of lubricant but which does not prevent passage of lubricant mist. This radially protruding disc 39 is disposed at or close to the drained groove 39 on the inside of the bottom bearing carrier 13 and is so configured that lubricant is projected and drained in order thereafter to be returned to the lubricant reservoir. The radially protruding disc may be provided with apertures or holes 40 to convey gas and lubricant mist from the space at the outlet device to the bottom bearing 5. The disc may also be provided with holes 41 at an inner radius to convey a film of lubricant to the bottom bearing. The disc 39 is provided on its side which faces towards the bottom bearing with support surfaces on which the bottom bearing 5 rests during the fitting of the lubricating device 14 and the bottom bearing 5 in the bottom bearing carrier 13.

The invention claimed is:

1. A centrifugal separator comprising: a spindle rotatably arranged in the centrifugal separator by means of a bearing device; said spindle being connected to a rotor in which centrifugal separation takes place during operation; a drive device which during operation is operable to cause the spindle and the rotor to rotate; a lubricating device comprising a reservoir arranged to contain a quantity of lubricant; and a pump device disposed in the centrifugal separator rotatable about a central axis, said pump device comprising a lubricant inlet situated at a first radially inner level to receive lubricant from the lubricant reservoir; an outlet device to deliver at least part of said lubricant from the lubricating device in the form of lubricant mist; and a duct for conveying lubricant from the lubricant inlet to the outlet device, which outlet device comprises at least one lubricant outlet situated outside the first radially inner level; said centrifugal separator further comprising a housing which at least partly surrounds the bearing device and the lubricating device and which allows lubricant mist to pass from the lubricating device to the bearing device; and wherein, the pump device comprises a gas inlet for input of a quantity of gas into the duct, and the outlet device comprises a gas outlet for delivery of said quantity of gas from the duct, whereby a gas flow is maintained from the gas inlet to the gas outlet during rotation of the pump device, in such a way that the gas flow brings along lubricant present in the duct towards the outlet device.

2. A centrifugal separator according to claim 1, wherein said gas outlet comprises a tubular duct and extends from a radially outer portion of the outlet device to a radially inner portion of the outlet device, at a second radially inner level, in communication with the duct in order, during rotation of the lubricating device, to generate a transfer of said quantity of gas from the gas inlet to the outlet device.

3. A centrifugal separator according to claim 2, wherein said lubricant outlet comprises a tubular duct and extends from a radially outer portion of the outlet device to a radially inner portion of the outlet device, outside the second radially inner portion, in communication with the duct in order, during rotation of the lubricating device, to deliver said lubricant in the form of lubricant mist.

4. A centrifugal separator according to claim 1, in which said lubricant output comprises one or more constrictions or nozzles.

5. A centrifugal separator according to claim 1 wherein the lubricating device comprises an input means for input of lubricant into the pump device.

6. A centrifugal separator according to claim 5, wherein the gas inlet takes the form of an aperture between the pump device and the input means.

7. A centrifugal separator according to claim 5, wherein the input means comprises a tubular element with a first end which extends into the duct in the pump device.

8. A centrifugal separator according to claim 7, wherein said first end of the tubular element has an asymmetrical termination.

9. A centrifugal separator according to claim 1, wherein the duct comprises a constriction at the pump device's lubricant inlet.

10. A centrifugal separator according to claim 1, wherein the lubricating device comprises a device for regulating the lubricant flow to the outlet device with respect to a physical characteristic related to the lubricant's viscosity.

11. A centrifugal separator according to claim 10, wherein the lubricant flow to the outlet device is regulated with respect to the lubricant's temperature.

12. A centrifugal separator according to claim 11, wherein the device for regulating the lubricant flow comprises a thermostat-controlled valve body.

13. A centrifugal separator according to claim 12, in which the tubular element is connected to a seat for the thermostat-controlled valve body.

14. A centrifugal separator according to claim 10, wherein the device for regulating the lubricant flow comprises a bypass duct which allows lubricant to pass to the outlet device when the device for regulating the lubricant flow is closed.

15. A centrifugal separator according to claim 1 wherein the pump device is connected axially to the centrifugal separator's spindle so that rotation of the spindle is converted to rotation of the pump device.

16. A centrifugal separator according to claim 15, wherein the pump device is arranged for rotation in a carrier for the bearing device.

17. A centrifugal separator according to claim 16, wherein the carrier for the bearing device is provided with at least one duct to convey gas from a space in- or outside the centrifugal separator's housing to the gas inlet.

18. A centrifugal separator according to claim 16, wherein the carrier is provided with at least one aperture which is radially outside said lubricant outlet and which makes it possible for lubricant mist to pass.

19. A centrifugal separator according to claim 18, wherein the carrier is provided with further apertures radially outside said lubricant outlet, which apertures are divided off in a circumferential direction by wall elements.

20. A centrifugal separator according to claim 1, wherein the bearing device comprises at least a first bearing means and a second bearing means.

21. A centrifugal separator according to claim 1, wherein the centrifugal separator comprises a fan device for generating a gas flow in the centrifugal separator's housing to convey lubricant mist from the lubricating device to the bearing device.

* * * * *